(12) United States Patent
Suenbuel et al.

(10) Patent No.: US 9,015,652 B2
(45) Date of Patent: Apr. 21, 2015

(54) DYNAMICALLY-GENERATED OPERATING SYSTEM FOR SENSOR NETWORKS

(75) Inventors: Asuman Suenbuel, San Jose, CA (US); Christof Bornhoevd, San Francisco, CA (US)

(73) Assignee: SAP SE, Walldorf (DE)

( * ) Notice: Subject to any disclaimer, the term of this patent is extended or adjusted under 35 U.S.C. 154(b) by 1773 days.

(21) Appl. No.: 11/313,311

(22) Filed: Dec. 21, 2005

(65) Prior Publication Data
US 2007/0143452 A1    Jun. 21, 2007

(51) Int. Cl.
*G06F 9/44* (2006.01)

(52) U.S. Cl.
CPC ........................................ *G06F 8/30* (2013.01)

(58) Field of Classification Search
CPC ...... G06F 8/10; G06F 8/20; G06F 8/30–8/37; G06F 9/445–9/44594
USPC ................................................. 717/104–106
See application file for complete search history.

(56) References Cited

U.S. PATENT DOCUMENTS

| | | | | |
|---|---|---|---|---|
| 5,038,296 | A * | 8/1991 | Sano .............................. | 706/45 |
| 5,353,411 | A * | 10/1994 | Nakaosa et al. ................... | 713/1 |
| 5,812,394 | A * | 9/1998 | Lewis et al. ...................... | 700/17 |
| 5,860,006 | A * | 1/1999 | Osborne et al. ............... | 717/106 |
| 5,901,319 | A * | 5/1999 | Hirst .............................. | 717/164 |
| 5,999,730 | A * | 12/1999 | Lewis ........................... | 717/109 |
| 6,016,394 | A | 1/2000 | Walker | |
| 6,075,939 | A * | 6/2000 | Bunnell et al. ................ | 717/107 |
| 6,138,271 | A | 10/2000 | Keeley | |
| 6,226,665 | B1 * | 5/2001 | Deo et al. ....................... | 718/106 |
| 6,604,235 | B1 * | 8/2003 | Harrison et al. ............... | 717/168 |
| 6,718,533 | B1 * | 4/2004 | Schneider et al. ............. | 717/100 |
| 6,865,429 | B1 * | 3/2005 | Schneider et al. .............. | 700/86 |
| 7,197,743 | B2 * | 3/2007 | Borg et al. ..................... | 717/120 |
| 7,231,632 | B2 * | 6/2007 | Harper .......................... | 717/109 |
| 7,346,891 | B2 * | 3/2008 | Anand et al. .................. | 717/107 |
| 7,367,020 | B2 * | 4/2008 | Bickle et al. .................. | 717/143 |
| 7,418,707 | B2 * | 8/2008 | Bentley et al. ................ | 719/310 |
| 7,716,632 | B2 * | 5/2010 | Covely, III .................... | 717/106 |
| 7,725,888 | B2 * | 5/2010 | Yodaiken et al. ............. | 717/163 |
| 7,739,671 | B1 * | 6/2010 | Hinchey et al. ............... | 717/136 |
| 7,752,608 | B1 * | 7/2010 | Hinchey et al. ............... | 717/136 |
| 7,844,396 | B2 * | 11/2010 | Zeitzew ........................ | 701/400 |
| 8,055,907 | B2 * | 11/2011 | Deem et al. ................... | 713/187 |
| 2002/0118223 | A1 * | 8/2002 | Steichen et al. .............. | 345/745 |
| 2002/0194398 | A1 * | 12/2002 | Bentley et al. ................ | 709/331 |

(Continued)

OTHER PUBLICATIONS

Chih-Chieh Han, Ram Kumar, Roy Shea, Eddie Kohler, and Mani Srivastava. 2005. A dynamic operating system for sensor nodes. In Proceedings of the 3rd international conference on Mobile systems, applications, and services (MobiSys '05). ACM, New York, NY, USA, 163-176.*

(Continued)

*Primary Examiner* — Matthew Brophy
(74) *Attorney, Agent, or Firm* — Brake Hughes Bellermann LLP

(57) ABSTRACT

Application requirements may be determined for executing an application using a sensor network, the sensor network including a plurality of devices. Hardware constraints associated with the devices may be determined, and an operating system may be generated, based on the application requirements and the hardware constraints. In this way, an operating system may be generated that is specific to, and optimized for, the the particular application and hardware resources.

20 Claims, 6 Drawing Sheets

(56) References Cited

U.S. PATENT DOCUMENTS

| | | | |
|---|---|---|---|
| 2003/0005412 A1* | 1/2003 | Eanes | 717/120 |
| 2003/0074487 A1* | 4/2003 | Akgul et al. | 709/328 |
| 2003/0120688 A1 | 6/2003 | Hill et al. | |
| 2003/0182652 A1 | 9/2003 | Custodio | |
| 2004/0005859 A1* | 1/2004 | Ghercioiu et al. | 455/3.01 |
| 2004/0006761 A1* | 1/2004 | Anand et al. | 717/101 |
| 2004/0177345 A1* | 9/2004 | Borg et al. | 717/130 |
| 2005/0081220 A1* | 4/2005 | Yodaiken et al. | 719/331 |
| 2005/0177269 A1* | 8/2005 | Funk | 700/121 |
| 2006/0010314 A1* | 1/2006 | Xu | 713/2 |
| 2006/0106920 A1* | 5/2006 | Steeb et al. | 709/220 |
| 2006/0142978 A1* | 6/2006 | Suenbuel et al. | 703/1 |

OTHER PUBLICATIONS

Dunkels, A.; Gronvall, B.; Voigt, T.; , "Contiki—a lightweight and flexible operating system for tiny networked sensors," Local Computer Networks, 2004. 29th Annual IEEE International Conference on , vol., no., pp. 455-462, Nov. 16-18, 2004.*

Bhatti, Shah, et al. "MANTIS OS: An embedded multithreaded operating system for wireless micro sensor platforms." Mobile Networks and Applications 10.4 (2005): 563-579.*

Dunkels, Adam, Bjorn Gronvall, and Thiemo Voigt. "Contiki—a lightweight and flexible operating system for tiny networked sensors." Local Computer Networks, 2004. 29th Annual IEEE International Conference on. IEEE, 2004.*

Wanner, L.F.; Junior, A.S.H.; Polpeta, F.V.; Frohlich, A.A., "Operating system support for handling heterogeneity in wireless sensor networks," Emerging Technologies and Factory Automation, 2005. ETFA 2005. 10th IEEE Conference on , vol. 2, no., pp. 6 pp. 518, Sep. 19-22, 2005.*

European Office Action, "EP Office Action mailed Nov. 29, 2007", European Patent Application No. 06026317.5, pp. 4.

European Search Report, "European Search Report (EP1801695A1) dated Apr. 20, 2007", European Patent Application No. EP06026317, pp. 21-22.

Friedrich, L. Fernando et al., "A Survey of Configurable, Component-based Operating Systems for Embedded Applications", IEEE Micro, IEEE Service Center, Los Alamitos, CA, US, vol. 21, Issue 3, May/Jun. 2001, pp. 54-68, XP002398009, ISSN: 0272-1732.

"TINYOS: Mission Statement", http://www.tinyos.net/special/mission, (Nov. 16, 2005),2 pages.

Becker, Marcel , et al., "Planware II: Synthesis of Schedulers for Complex Resource Systems", Apr. 2003, 10 pages.

Greenstein, Ben , "A Sensor Network Application Construction Kit (SNACK)", *SenSys '04* (Nov. 3-5, 2004),12 pages.

Hill, Jason L., "System Architecture for Wireless Sensor Networks", *Dissertation of Jason Lester Hill, University of California, Berkeley*, (2003), 186 pages.

Levis, Philip , "TinyOS: An Operating System for Sensor Networks", Feb. 17, 2004, 32 pages.

Office Action for Chinese Application No. 200610130901.8 (with English Translation), mailed May 19, 2011, 12 pages.

\* cited by examiner

DYNAMICALLY-GENERATED OPERATING SYSTEM FOR SENSOR NETWORKS

TECHNICAL FIELD

This description relates to operating systems, including operating systems for devices of sensor networks.

BACKGROUND

Sensors networks may be used to provide detection, characterization, or other uses of data that may be related to virtually any type of physical process, operation, or environment. For example, sensor networks may be deployed at a variety of locations across an enterprise, and may be used, to name just a few examples, to implement a temperature detection system, a fraud monitoring operation, or a patient tracking system.

In providing these and many other types of functionalities, devices of sensor networks may each be provided with local processing power, memory, and communication capabilities, in addition to being provided with desired sensors and/or output elements. Nonetheless, such sensor devices of sensor networks may be provided relatively inexpensively in cost, and may be extremely small in size. As such, sensor networks including such devices may be deployed within and across a large and diverse geographical region (e.g., as part of a supply chain management system), and/or may be used in a more concentrated area, in order, for example, to provide a relatively large number of data points for use in a corresponding application (e.g., detecting temperature fluctuations throughout a room).

The reduced cost and size of such sensor devices, however, generally imply a premium being placed on some or all of the included processing power, memory, or communication capabilities, or use thereof. For example, wireless communications executed by such sensor devices may impose a relatively large burden on a power supply of the sensor device.

SUMMARY

According to one general aspect, a method includes determining application requirements for executing an application using a sensor network, the sensor network including a plurality of devices, determining hardware constraints associated with the devices, and generating an operating system based on the application requirements and the hardware constraints.

According to another general aspect, a system includes a components repository that is operable to store operating system components associated with functionality to be provided to a plurality of devices of a sensor network, and an operating system generator that is operable to generate an operating system from selected operating system components, based on application requirements associated with executing an application on the plurality of devices and on hardware constraints associated with the plurality of devices.

According to another general aspect, an apparatus includes a storage medium having instructions stored thereon. The instructions include a first code segment for determining application requirements associated with an application to be deployed on a sensor network, a second code segment for determining hardware constraints associated with hardware resources of the sensor network, and a third code segment for generating an operating system that supports the application and the hardware resources.

The details of one or more implementations are set forth in the accompanying drawings and the description below. Other features will be apparent from the description and drawings, and from the claims.

DETAILED DESCRIPTION

Figure 1:
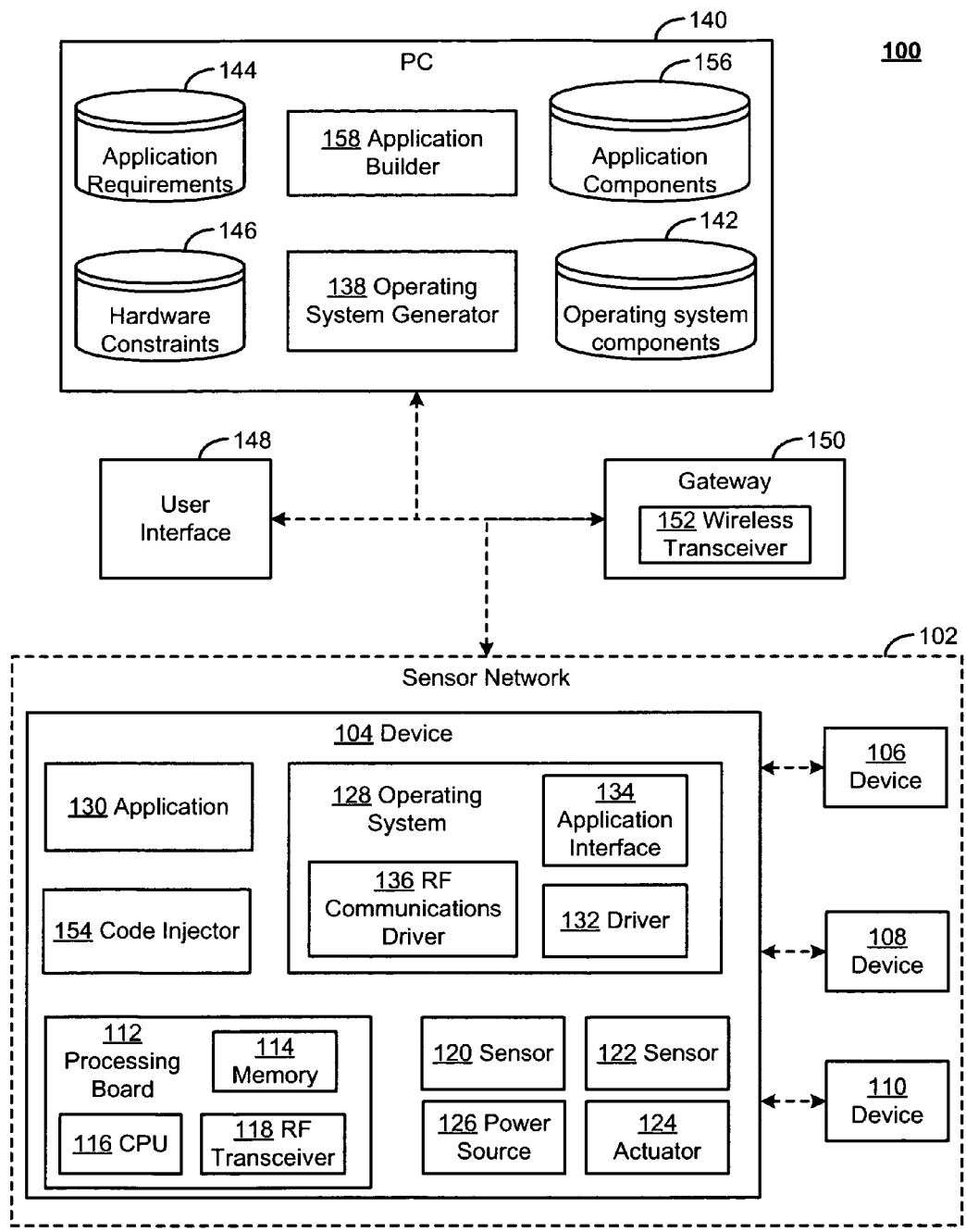
FIG. 1 is a block diagram of a system for generating operating systems for use in devices of a sensor network.

FIG. 1 is a block diagram of a system 100 for generating operating systems for use in devices of a sensor network 102. The system 100 generates the operating systems as-needed for use in supporting applications and hardware resources associated with the devices of the sensor network 102. Moreover, the operating systems may be generated based on the application requirements and hardware resources, for the specific support thereof. Accordingly, computing resources (e.g., processing power, memory, or power) of the devices of the sensor network may be conserved and/or used efficiently.

In the example of FIG. 1, the sensor network 102 includes a plurality of devices 104, 106, 108, and 110. The devices 104-110 may include sensor motes or other devices that may be deployed in a wide range of settings and scenarios. For example, the devices 104-110 may be placed in stationary positions around a room or other site, or may be attached to movable items (e.g., vehicles, pallets or other containers, or persons), or may themselves have some locomotive ability (e.g., may be made to move through water when providing sensing in an underwater environment). The devices 104-110, as described in more detail below, may be associated with one or more sensors or output elements, and so may collect data for local or remote use and analysis thereof.

By way of example, the device 104 is illustrated as including various examples of components that are intended to illustrate, and provide for the explanation of, various aspects of the sensor network 102 that are described in more detail, herein. However, it should be understood that the device 104 may include additional or alternative components, as would be apparent, e.g., depending on a desired use. Further, although not illustrated in FIG. 1, it should be understood that any of the devices 106-110 also may include any of the various illustrated components, or other components, as would be apparent.

Thus, the device 104 is illustrated as including a processing board 112 that includes a memory 114, a central processing unit (CPU) 116, and a radio frequency (RF) transceiver 118. For example, the memory 114 may include random access memory (RAM), and/or read only memory (ROM). The CPU 116 may include any of a number of available microprocessors that are known to be useful in the operation of sensor network devices. Similarly, the RF transceiver 118 may be associated with a known structure and functionality for providing wireless communication between the device 104 and any of the devices 106-110, as well as with other devices, as described in more detail below.

Additionally, although referred to as the processing board 112 for the example of FIG. 1, it should be understood that elements of the processing board 112, and other elements that may be shown or not shown in FIG. 1, may be included on a single microprocessor chip. Further, although the RF transceiver 118 is illustrated in FIG. 1, it should be understood that other forms of communication, e.g., optical communication, also may be used.

The device 104 also may include, or be associated with, a sensor 120 and a sensor 122. As referenced above, such sensors may be used to detect, directly or indirectly, virtually any characteristic or condition of an environment of the device 104. Although some examples of such sensors are provided above, other examples of sensors that may be included as the sensors 120/122 include microphones, accelerometers, magnetometers, cameras or other image sensors, motion detectors, light detectors (e.g., photodiodes), Radio Frequency Identifier (RFID) readers (to identify active or passive RFID tags), and/or sensors designed to detect conditions related to humidity, pressure, or vibration.

The device 104 also may include an output element 124, which may generally refer to any device that is operable to provide an action or other output. For example, the output element 124 may include a light-emitting diode (LED), an audio speaker, an actuator, or any other device that provides some effect on or in the environment of the device 104.

As with the sensors 120, 122, the output element 124 is illustrated as a separate element of the device 104. However, it should be understood that the sensors 120, 122 and the output element 124 may be partially or wholly integral with one another, and, for example, may be implemented as part of a single micro-electromechanical system(s) (MEMS). Moreover, such MEMS sensors or output elements may be produced on the same microchip as the memory 114, CPU 116, and may thus be used to form embedded systems for use with the device 104.

A power source 126 may be used to provide power to the device 104. For example, the power source 126 may power the elements of the processing board 112, the sensors 120, 122, or the output element 124. Although illustrated as a single power source, it should be understood that multiple power sources may be included on, or in association with, the device 104. For example, local battery power may be provided for the elements of the processing board 112, while power for the sensors 120, 122 and the output element 124 may be provided by a connected, larger power source, as needed.

Thus, elements 112-126 generally illustrate examples of various hardware and/or physical components or resources that may be included or associated with the device 104. As referenced above, a selection, design, and use of such hardware resources may be constrained by a need or desire to reduce a cost and/or size of the device 104.

In addition to the physical components just described, the device 104 also may provide various software components associated with the physical, hardware components. For example, an operating system 128 may be included that represents software stored in the memory 114 and running on the CPU 116, and that is responsible for control and management of some or all of the physical components 112-126, as well as for basic system operations associated therewith.

Further, the operating system 128 may provide a foundation upon which to run applications being implemented using the memory 114 and the CPU 116, e.g., an application 130. Such applications may be used in specific implementations of the device 104 in, for example, detecting, collecting, aggregating, pre-processing, transmitting, reporting, or otherwise using data associated with an environment of the device 104.

Thus, the operating system 128 may be used, for example, to implement the application 130, to support the hardware devices such as the sensors 120, 122 and the output element 124, and to support basic system operations associated with any of these elements, or with the elements of the processing board 112 (e.g., management of the memory 114, or scheduling tasks of the CPU 116). In order to provide and support such functionalities, the operating system 128 includes a number of different types of components or elements.

For example, the operating system 128 may include one or more drivers that are designed to allow interaction between the application 130 and a hardware device. For the sake of example, the operating system 128 of FIG. 1 is illustrated as including a driver 132 that may represent a driver associated with one of the sensors 120, 122, or with the output element 124. Although only one driver is illustrated in the example of FIG. 1, and as described in more detail below, one or more drivers may be used, depending on which of the sensors 120, 122, output element 124, or other hardware resources of the device 104 are to be used for a respective application 130.

Somewhat similarly, the operating system 128 includes an application interface 134 that allows communication between the operating system 128 and the application 130. For example, the application interface 134 may allow the application 130 to call certain functionalities of the operating system 128, such as, for example, functionalities related to wireless connectivity of the device 104 with one or more of the devices 106-110.

Thus, the driver 132 and the application interface 134 may be included in the operating system 128 based on requirements of the application 130, and/or on an availability or use of the sensor 120 or other hardware constraints associated with the device 104. In this sense, the driver 132 and the application interface 134 may be considered to result from selection of the application 130, as opposed to other applications that may be run on the device 104. Other portions of the operating system 128, however, may be partially or wholly independent of a selection for the particular application 130, i.e., may be used with virtually any such application.

For example, a radio frequency (RF) communications driver 136 may be included in the operating system 128 for allowing communication between the operating system 128 and the RF transceiver 118 (and thereby for wireless communications with the devices 106-110). To the extent that RF communications are used by most or all applications that may be implemented on the device 104, the RF communications driver 136 may be included as an example of a component of the operating system 128 that may be included therein for virtually any application of the device 104.

Somewhat similarly, other components of the operating system 128, although not shown, may be included that perform functionality associated with core functions of the device 104 and associated components, such as, as already mentioned, management of the memory 114 or scheduling of the CPU 116. As described below, such components may be integral in providing certain basic functions that, again, are common to virtually any application running on the device 104.

Although the operating system components 132, 134, and 136 are generally included to provide examples of the type of components that may be included in the operating system 128, it should be understood that many other types of components also may be included in the operating system 128. For example, in addition to the driver 132 (which, for example, may be supporting the sensor 120), additional operating system components may be included to support or enable use of the sensor 122 or the output element 124. For example, additional drivers may be included, and sensor input/output components may be included to enable communication with or between the sensors 120, 122.

Additionally, operating system components associated with the application 130 may be included other than the application interface 134. For example, components may be included that are associated with calls requested by the application 130 from/by the operating system 128 (e.g., calls causing the CPU 116 to change a mode of operation). Further, additional operating system components may be associated with functionality of the operating system 128 itself, such as, for example, an operating system loader or user interface.

Thus, in the example of FIG. 1, an operating system generator 138 is included that is operable to generate the operating system 128, where the resulting operating system 128 includes only those components that are required, selected, desired, and/or optimized for inclusion therein for support of the application 130 (or other included applications, if any), as well as for supporting only those hardware resources of the device 104 that are to be used during execution of the application 130.

For example, it may be the case that the application 130 is a temperature-detection application, while the sensor 120 may be a temperature sensor. In a straight-forward example, then, it may be the case that the temperature-detection application 130 simply reads detected temperature values from the sensor 120 for collection, analysis, and/or reporting thereof. Thus, the driver 132 may represent a temperature sensor driver for operating the sensor 120 during the collection/reporting of the temperature data. In this example, then, the operating system generator 138 would generate the operating system 128 as including the driver 132, but not including, for example, a driver for the separate sensor 122, or a driver for the output element 124. Accordingly, resources of the device 104, including the memory 114, the CPU 116, and the power source 126 may be conserved and used efficiently.

In another example, the application 130 may include functionality for responding to a temperature variation detected by the temperature sensor 120, using the output element 124. For example, the application 130 may be operable to detect that a local temperature has risen above 100 degrees or some other pre-defined value, and then cause a lighting of an LED used as the output element 124. In this example, a second driver (not shown in FIG. 1) may be generated by the operating system generator 138 for inclusion within the operating system 128, for driving the output element (LED) 124 in response to commands from the application 130 and/or an output of the (temperature detection) sensor 120. Again, since such a second driver may be included only when needed for support of the output element 124 in the context of the application 130, and not included otherwise, resources of the device 104 may be conserved and used efficiently.

In operation, the operating system generator 138 may be implemented on a personal computer (PC) 140, implemented on a workstation, or implemented on virtually any other computing device having sufficient resources for operation thereof. The operating system generator 138 may assemble the operating system 128 using an operating system components repository 142 that is preconfigured with operating system components. For example, each such operating system component in the components repository 142 may be associated with an interface that enables the accessing and combining of its associated operating system component.

In choosing and combining the operating system components into the operating system 128, the operating system generator 138 may access or otherwise determine application requirements 144 and hardware constraints 146 that correspond, in the example of FIG. 1, to the application 130 and the hardware resources 112-126, respectively. For example, the application requirements 144 may generally represent requirements associated with any desired use of the devices 104-110 of the sensor network 102. Such uses may include, for example, item tracking (e.g., tracking an item to be produced and sold through a supply chain), monitoring (e.g., fraud monitoring or theft monitoring), patient tracking in a health care system, or virtually any use of the sensor network 102. Thus, in some implementations, the operating system generator 138 may determine the application requirements 144 based on a selection or description of the application 130, e.g., by decomposing and analyzing the application 130 to determine associated constraints or components. In other implementations, the application requirements 144 may be input by an interactive user (e.g., an application developer).

Meanwhile, the hardware constraints 146 may refer generally to limitations or capabilities of the sensor network 102 in terms of what hardware devices or resources may be available and/or desired for use with the application 130. For example, the devices 104-110 may each include a given type of sensor, or only some subset of the devices 104-110 may include a particular type of sensor. The sensors (as well as output elements such as the output element 124) may vary widely in terms of types of measurements obtained, reliability of performance, power consumption, or quality of measurements obtained. Some of the sensors and output elements may be highly relevant to the application 130, while others may be less relevant, or irrelevant.

In FIG. 1, although the application requirements 144 and the hardware constraints 146 are illustrated conceptually as being stored in association with the PC 140, it should be understood that this is merely an example, and that the application requirements 144 and the hardware constraints 146 may be partially or wholly obtained from other sources. For example, a user interface 148 may be used to allow a user (not shown in FIG. 1) to specify some or all of the application requirements 144 and/or the hardware constraints 146. For example, as described in more detail below, the user interface 148 may allow the user to specify a desired type of application, such as one or more of those mentioned herein, as well as a desired type of sensor(s) or output element(s) that are desired to be used to implement the application.

Additionally, or alternatively, some or all of the application requirements 144 and/or the hardware constraints 146 may be predetermined beforehand, for future use of the operating system generator 138. For example, the hardware constraints 146 may include a preconfigured listing of all of the devices 104-110 of the sensor network 102, as well as a listing of the type and quantity of sensors and/or output elements on each device.

Still further, the hardware constraints 146 may include information as to which of the hardware resources of the sensor network 102 are currently being used, and are therefore unavailable for use by the application 130. In such examples, a monitoring and/or tracking system (not shown in FIG. 1) may be used to determine current resource usages of the sensor network 102.

Based on the application requirement 144 and the hardware constraints 146, the operating system generator 138 may generate the operating system 128. For example, the operating system generator 138 may use code synthesis techniques for combining operating system components from the operating system components repository 142 and thereby generating the operating system 128, as described in more detail below with respect to FIG. 4. Thus, the resulting operating system 128 may include only those components that are necessary or desired for implementing the application 130, while still operating non-application specific functionality (e.g., memory management) that may be necessary for virtually any such application.

Once generated in this manner, the operating system 128 may be deployed by a gateway computer 150 to the device 104, and/or to the devices 106-110. Such a gateway may represent, for example, a computing device located at an edge of (and communicating with) the sensor network 102. The gateway computer 150 may be powerful enough to communicate with remote systems (e.g., the PC 140) and perform other functionality associated with the sensor network 102, and may thereby relieve the sensor network 102 from performing such functionality.

In deploying the operating system 128, for example, a wireless transceiver 152 may be included within the gateway computer 150, and may be used to wirelessly transmit the operating system 128 to a code injector 154 that is installed on the device 104. The code injector 154 may then operate to inject the operating system 128 onto the device 104. Similar comments apply to an injection of the operating system 128 onto one or more of the remaining devices 106-110.

For example, it may be the case that only some subset of the devices 104-110 of the sensor network 102 are required for implementation of the application 130. In this case, the operating system 128 may be deployed only onto those devices included within the subset of devices.

In FIG. 1, an application components repository 156 is included that represents components that may be used by an application builder 158 to construct the application 130 with a level of particularity desired by the user (perhaps in conjunction with the application requirements 144 and/or the hardware constraints 146). For example, in the temperature-detection application referenced above, a first application component from the application component repository 156 may be associated with a desired operation of the (temperature) sensor 120 (e.g., sampling rates, cut-off or dangerous temperature values, or communications with other sensors or output elements), while a second application component may be associated with use of the output element 124 (e.g., an LED and a criteria for operation thereof, including, for example, a frequency of flashing depending on a currently-detected temperature). Thus, the user may customize the application 130 by selecting one or both of such application components, as desired, for combination with one another and/or with other components.

It should be understood, however, that providing applications in such a customized manner is merely an example. In other implementations, applications may be provided as a whole, which may make it easier and more intuitive (although potentially less flexible) for some users to select and use a desired application. Such applications, and other applications, may be parameterized by the user to perform a desired functionality (e.g., by providing specific settings or contexts for deployment of the sensor network 102). In other implementations, users may be enabled to construct and use application and/or application components, in order to provide highly-customized applications. In any such examples, however, and in other examples, the operating system generator 138 may generate the operating system 128 in a manner that is specific both to the selected/constructed/parameterized application 130, and to the hardware resources used by the application 130.

However the application 130 is selected or built, the gateway computer 150 may be used to deploy the application 130 to the device 104 (and some or all of the other devices 106-110), using, for example, the same or similar techniques described above for the operating system. For example, the gateway computer 150 may wirelessly transmit the application to the code injector 154 for injection into the memory 114 and execution by the CPU 116.

Thus, the system 100 allows for dynamic generation and deployment of operating systems that are specific to the application requirements and hardware constraints of devices of a specific sensor network. In this way, use of the sensor network 102 may be optimized. For example, since an amount of memory and processing power associated with the operating system 128 may be minimized, this memory and processing power may be dedicated to further functionalities of the application 130 and/or the sensors 120, 122/output element 124 than may otherwise be available. Additionally, or alternatively, power associated with operating the devices of the sensor network 102 may be reduced or otherwise conserved.

Although FIG. 1 illustrates certain examples of dynamic generation of operating systems, many other examples and configurations are possible. For example, as described in more detail below with respect to FIGS. 5 and 6, some or all of the functionality described with respect to the PC 140, including the operating system generator 138, may be performed directly on the gateway computer 150. Further, the use of the operating system generator 138 may be deployed as a service over a network, e.g., over an enterprise intranet, so that the user interface 148 may be associated with an enterprise portal and accessed by enterprise employees for a desired sensor network.

Additionally, although the application requirements 144 and the hardware constraints 146 are described as being used by the operating system generator 138 in generating the operating system 128, it should be understood that other requirements/constraints may be used. For example, as described in more detail with respect to FIGS. 5 and 6, non-functional constraints may be included, such as, for example, power-saving functionalities such as commands to send one or more elements of the device 104 into a sleep/hibernation mode after a certain period of time, or after a specified event. Similarly, system-wide and/or network constraints may be used to generate the operating system 138. For example, the sensor network 102 may have certain requirements that must be observed by the operating system generator 138, such as limitations on a number or type of devices that may run the application 130 at a given time.

Figure 2:
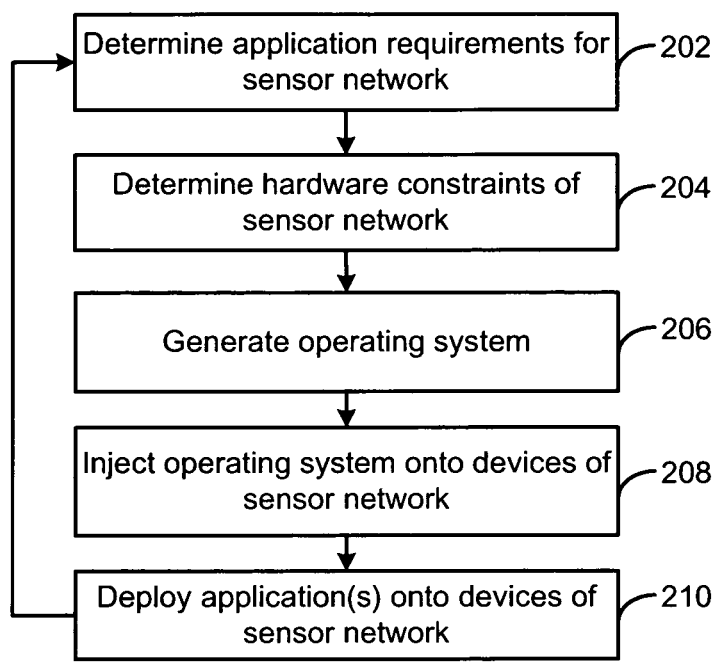
FIG. 2 is a flow chart illustrating an example operation of the system of FIG. 1.

FIG. 2 is a flow chart 200 illustrating an example operation of the system 100 of FIG. 1. In the example of FIG. 2, and as described above, application requirements for a sensor network may be determined (202). For example, a user may enter the application requirements 144 by way of the user interface 148. Similarly, the user may select (or otherwise specify, describe, or provide) the application 130, and the operating system generator 138 may decompose the application 130 to determine the application requirements 144. Additionally, or alternatively, the application requirements 144 may be pre-configured and/or stored in advance of a particular application deployment, depending on known types of applications at the sensor network 102.

As described herein, the application requirements may generally include a desired response of the application to a condition, e.g., to a temperature, light, sound, or other condition that may be determined by the sensors 120, 122. For example, such an application response to a sensed condition may be to stop or begin collecting data, to transmit data, to initiate use of another sensor, or to initiate use of the output element 124 (e.g., to light an LED or sound an audio speaker).

As referenced above, some applications may be described at a very high level for ease of use by the user, so that, for example, the user may simply specify a very high-level description of the application 130, such as "temperature-detection." In such examples, the high-level application description/specification may be configured as being associated with (perhaps selectable) specific lower-level application requirements, such as, for example, a type of temperature sensor to be used, or a density of temperature sensors to be deployed in an area, or a frequency of temperature measurements obtained by the temperature sensors.

Hardware constraints of the sensor network also may be determined (204). For example, the hardware constraints 146, as described, may represent capabilities or limitations of the (types of) devices available within the sensor network 102. For instance, the hardware constraints 146 may include the types of sensors/output elements that are available on each of the devices 104-110, as well as other hardware restrictions that may be in place, e.g., limitations of the memory 114, CPU 116, or the power source 126.

As referenced above, the hardware constraints 146 may be specified in whole or in part by the user, by way of the user interface 148. In other implementations, the hardware constraints 146 may be wholly or partially preconfigured and stored. In some implementations, specification of specific ones of the application requirements 144 may result in a narrowed list of possible hardware constraints, which may be further specified/narrowed by user selection. Conversely, specific hardware constraints may be designated before specific application requirements are determined, so that a narrowed list of applications/application requirements may be generated based on the specified hardware constraints.

Then, an operating system may be generated (206). For example, the operating system generator 138 may access or otherwise determine the application requirements 144 and the hardware constraints 146, and may proceed to generate the operating system 128 based thereon. For example, the operating system generator 138 may synthesize the code of the operating system 128, using components of the operating system components repository 142. As described herein, the operating system generator 138 may thus generate the operating system 128 as including only those operating system components that are necessary or desired for implementation of the application 130, while optimizing the operating system 128 for the specific application, device, and/or sensor network. In other words, the operating system may be generated to provide support for a subset of available hardware resources (e.g., one or more of sensors 120, 122, output element 124, memory 114, CPU 116, RF transceiver 118, or power supply 126) of the devices, the subset of available hardware resources being sufficient to satisfy the application requirements and execute the application.

Once generated, the operating system may be injected onto one or more devices of the sensor network (208). For example, the wireless transceiver 152 of the gateway computer 150 may be used to transmit the operating system 128 to the device 104, for injection thereon by the code injector 154. Similar comments may apply for injection of the operating system 128, or variations thereof, onto desired or necessary ones of the devices 106-110.

The application itself may be designated, assembled, and/or deployed on the sensor network (210), presumably on top of the operating system 128. For example, the application builder 158 may construct the application 130 using the application components 156, and/or the application requirements 144. In other implementations, the application 130 may be pre-configured and pre-built. Also, it should be understood that the application 130 may be designated or built prior to, or concurrently with, generation of the operating system 128. Once assembled or otherwise determined, the application 130 also may be deployed unto the devices 104-110, e.g., by way of the wireless transceiver 152 and the code injector 154 (as well as similar code injectors that may be included on the devices 106-110).

Finally with respect to FIG. 2, the process of the flowchart 200 may iteratively continue, i.e., by returning to a determination of application requirements (202) and continuing again through the flowchart 200. For example, a first operating system may be deployed on the sensor network 102 for use with a first set of applications and hardware resources (e.g., sensors and output elements). Then, the same sensor network may later be used with a different operating system, supporting different application(s) and hardware resource(s). Accordingly, savings in cost and effort may be realized, since the sensor network may be applied to a wide variety of functionalities and applications.

Figure 3:
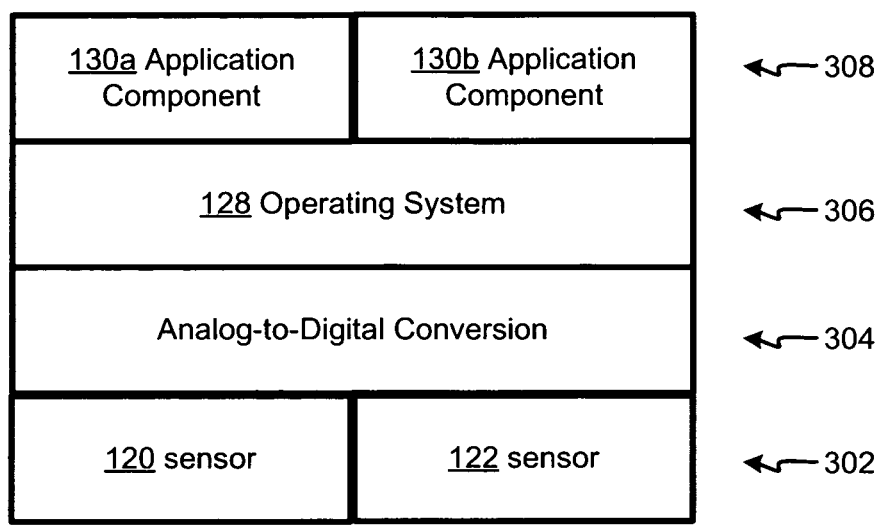
FIG. 3 is a block diagram of system layers of a device of the sensor network of FIG. 1.

FIG. 3 is a block diagram of system layers of the device 104 of FIG. 1. In the example of FIG. 3, a first level 302 is shown as a hardware level at which the sensors 120, 122 are implemented. Of course, the output element 124 also may be included at the level 302, as well as other hardware resources of the device 104.

The sensors 120, 122 at the hardware level 302 collect analog data, such as a stream of data that includes measurements of a temperature local to the sensors 120, 122. The analog data is converted to digital form at a second layer 304, i.e., an analog-to-digital conversion layer 304.

The operating system 128 may then receive the digitized data at an operating system level 306. For example, the operating system 128 may be constructed by the operating system generator 138 to include components for receiving and interpreting digitized data from the sensors 120, 122.

One or more applications (illustrated in FIG. 3 as application components 130A and 130B) may be constructed in an application level 308, built on top of the operating system 128 on the operating system level 306. That is, the operating system level 306 may support a single application, an application comprising on or more components or modules, or a plurality of applications.

FIG. 3 thus illustrates, as described above, that the operating system 128 may support a plurality of sensors. The operating system 128 also may support operation and functionality of a plurality of different applications or application components. By dynamically generating the operating system 128 using the operating system generator 138, the operating system 128 may be configured to support only those specific hardware and software resources that are associated with the device 104 for a given deployment of the device 104 and the sensor network 104.

Figure 4:
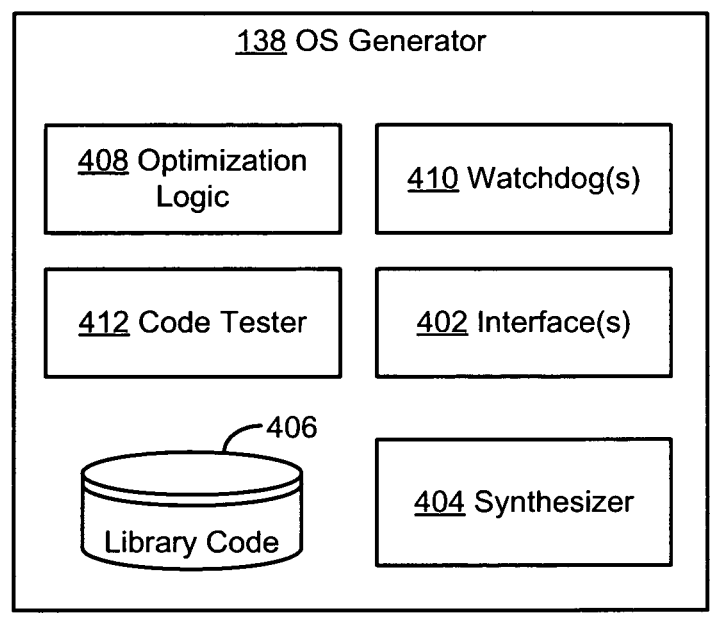
FIG. 4 is a block diagram of a detailed view of an example implementation of an operating system generator of FIG. 1.

FIG. 4 is a block diagram of a more detailed view of an example implementation of the operating system generator 138. In the example of FIG. 4, the operating system generator 138 includes one or more interfaces 402 that allow the operating system generator 138 to communicate with, for example, the user interface 148, the application requirements 144, the hardware constraints 146, and the operating system components 142.

Using such data, a code synthesizer 404 is used to dynamically synthesize the operating system 128. The code synthesizer 404 may be implemented, for example, using an application layer specific to the operating system generator 138, on top of known software synthesis platform(s).

In operation, for example, the synthesizer 404 may implement a matching algorithm between elements of the application requirements 144, the hardware constraints 146 and the operating system components 142 that are required. In this way, the synthesizer may determine various algorithms, and/or data structures to be used in the operating system 128. Then, based on the matching operations, the synthesizer 404 may access library code 406, which may include preconfigured code sections and/or generic code templates useful in representing the algorithms and/or data structures in a given target language in which the operating system 128 ultimately will be written.

At this stage, optimization logic 408 may be used by the synthesizer 404 so as to generate the operating system 128 in a manner that is optimized with respect to the sensor network 102 as a whole (or relevant portions thereof). For example, the optimization logic 408 may be used to implement interleaving processes to maximize utilization of CPU and input/output resources, or to optimize a scheduler of the CPU 116. In the latter example, for instance, pre-emptive scheduling may be used in which a context of the CPU 116 is switched without waiting for an executing application to relinquish use of the CPU 116.

During or after the operations of the synthesizer 404, one or more watchdog applications 410 may be used to ensure that generation of the operating system 128 is inclusive of any components that are necessary or desired for deployment of operating systems and/or applications, but that may not be directly related to the functionality of the application(s) running on the operating system 128. For example, as referenced above, the device 104 may include a RF communications driver 136 which may be assumed to be included for virtually all applications that may run on the device 104 and/or that require some form of radio-frequency communications. In this case, the watchdog 410 may act to ensure that the synthesizer 404 includes the RF communication driver 136 in assembling the operating system 128, even thought the RF communication driver 136 may not be specified in either the application requirements 144 or the hardware constraints 146. Thus, the synthesizer 404 may be prevented from specializing or optimizing the operating system 128 for use with the application 130 and/or hardware resources (e.g., the sensor 120, the sensor 122, or the output element 124) to such an extent that core, underlying, and/or essential operating system components are not included within the operating system 128.

In similar examples, the watchdog application 410 may ensure that certain operating system components are included in the operating system 128 that are essential to any operating system that may be deployed on the devices 104-110, or that are essential to an overall operation of the system 100. For example, operating system components may be included that are used for memory management of the memory 114, or for scheduling of tasks of the CPU. Further, certain elements may be associated with the operating system 128, such as code associated with operating the code injector 154, or code for loading the operating system at a start of the device 104 (where, e.g., a generic, initial version of an operating system may initially be installed for the device 104, in order to allow the further generations of operating system(s) as described herein). In this regard, it should be apparent that injection and operation of an operating system that fails to account for functionality of the code injector 154 (or start-up code) may result in an inability of the system 100 to thereafter deploy or operate a second, later-deployed operating system (or to install a corresponding application(s)).

Once synthesized in a manner described above, the resulting code may be compiled in the specified target language. Then, prior to actual deployment of the newly-generated operating system 128, a code tester 412 may be used to test operations of the generated code to ensure operability, performance, and reliability. For example, test data may be generated by the code tester 412 and operated on by the generated operating system.

Figure 5:
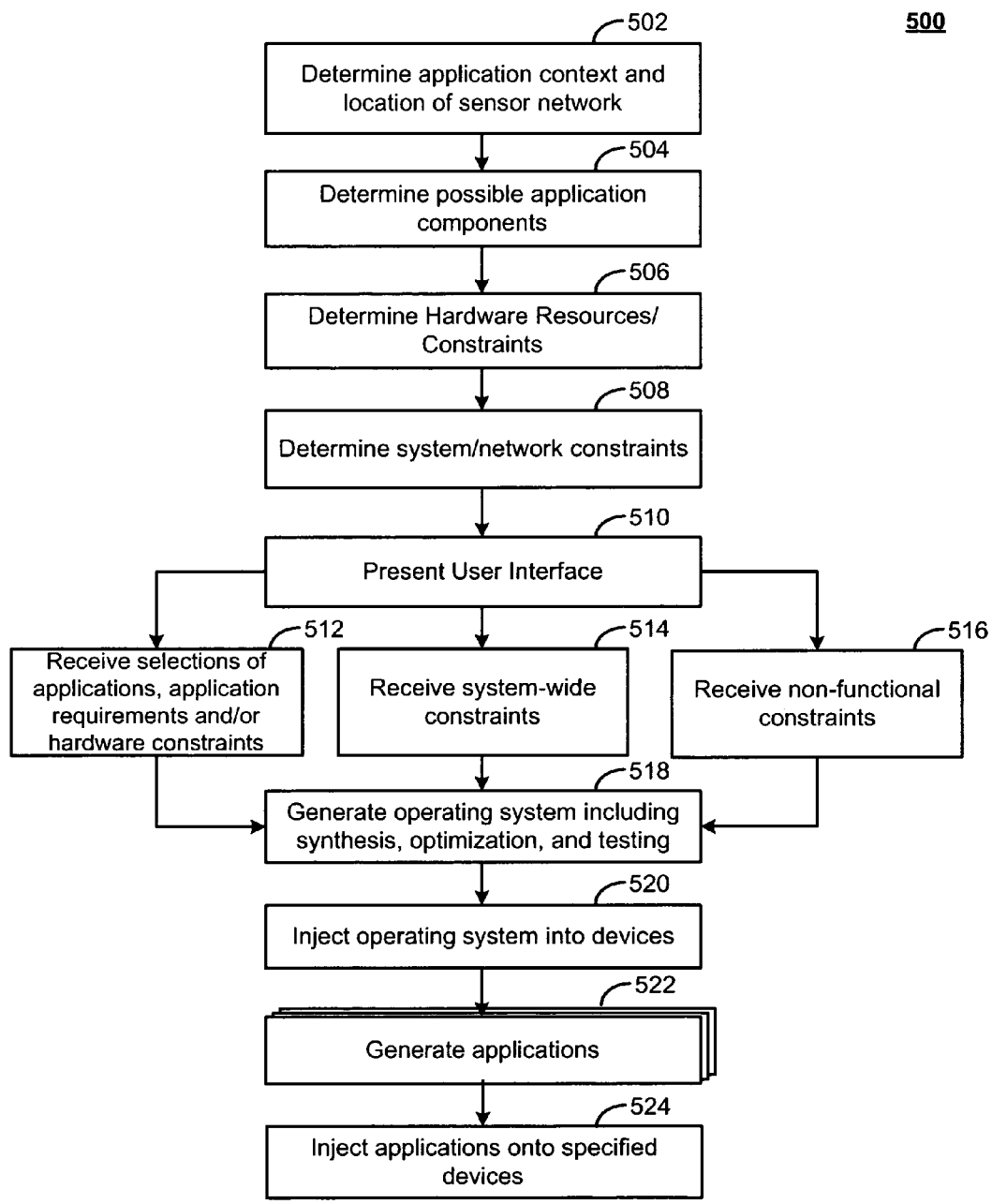
FIG. 5 is a flow chart illustrating an operation of the system of FIG. 1.

FIG. 5 is a flow chart 500 illustrating an operation of the system 100 of FIG. 1. In FIG. 5, it is assumed that the system 100 is implemented across a relatively large number of sensor networks. For example, the system 100 may be implemented in the context of an enterprise-wide network comprising sensor networks disposed at a number of locations spread across a large geographical region. As another example, the system 100 may include a large number of sensor networks and/or devices at a particular site or location, perhaps performing many different types of operations. In the latter example, for instance, in a warehouse setting, there may be sensor networks deployed to monitor inventory, or to provide fraud detection/theft detection, or to sense conditions in the warehouse that may be related to maintenance or storage of the warehouse goods (e.g., temperature-detection, humidity detection, vibration detection, or moisture detection).

Thus, in FIG. 5, initially, an application context and/or location of a sensor network may be determined (502). For example, as in the examples above, it may be that a user accesses the user interface 148 to specify that the user is interested in a temperature-detection application for one or more sensor networks that are specified as being located within a warehouse environment. By limiting the application context and/or sensor network location in this manner, the system 100 may be able to provide the user with a more focused selection criteria and a faster and more efficient deployment of a desired operating system and/or application, as described in more detail below.

For example, based on the application context and/or location of the sensor network, the system 100 may narrow a number of possible application requirements, components, or characteristics that may be made available to the user (504). For example, if the user specifies a particular warehouse for a desired application deployment, then the system 100 may know in advance what types of applications are necessary or available or otherwise associated with that warehouse. Of course, as described above, in some implementations the user may nonetheless be allowed to add further applications/components/requirements, in cases where the user is desirous and capable of doing so.

Similarly, the system 100 may determine available hardware resources and/or constraints (506) associated with the specified application context and/or location of a sensor network. That is, as with the example above, the system 100 may determine that in the specified warehouse, only a limited set of sensors and/or output elements are available. In this sense, a determination of available hardware resources or of hardware constraints may refer to an absolute description of which sensors and/or output elements are installed on devices at the warehouse site, or, in other implementations, may refer to the number of such sensors and/or output elements that are currently not otherwise in use at the warehouse site. In the latter example, the system 100 may perform monitoring of the available hardware resources in order to determine availability thereof.

The system 100 also may determine various system and/or network constraints (508) that may be relevant to a desired application deployment to be specified by the user. For example, the system 100 may determine that sensor networks at the specified warehouse site may have certain power limitations, or may have certain communication limitations that may not necessarily be present in other sensor networks.

Based on the foregoing, the system 100 may present the user with a user interface (510), such as the user interface 148, in which the user is allowed to specify desired features and functionalities to be associated with the specified sensor network(s). For example, as described above with respect to FIG. 2, the user interface 148 may receive selections of applications, application requirements, and/or hardware constraints designated by the user (512). For instance, as described in more detail below with respect to FIG. 6, the user may specify through the user interface 148 that a temperature-detection application is desired for deployment onto a given sensor network having certain hardware constraints associated therewith.

In some implementations, specification of applications, application requirements, and/or hardware constraints may be performed in a simple, straight-forward manner. For example, a user may simply designate one or more preconstructed applications that are known in advance to be associated with certain hardware constraints, where upon the system 100 may proceed with generating an associated operating system, as described herein. In other examples of implementations, more sophisticated users may be permitted to construct a desired application using application components 156, or, in some examples, may be permitted to construct their own applications or application components for use in system 100.

The user interface 148 also may be used to receive selections of system-wide constraints (514) that may be specified by the user. For example, in the warehouse setting described above, it may be the case that certain chemicals are stored in the warehouse which are combustible in one another's presence, and therefore should not be stored in proximity to one another. Accordingly, system-wide constraints should be in place by which pallets storing the chemicals are required to maintain a certain distance from one another at all times. Then, sensors associated with each pallet may share location information for enforcement of the system-wide constraint.

Non-functional constraints also may be received (516) through the user interface 148. That is, such non-functional constraints may be applied without specific regard for, or reference to, functionality of the application in question. Such non-functional constraints may include, for example, certain power saving features, certain constraints on communication between devices that may be specified by the user, or any other constraints that are associated with the devices (or core operations thereof), but are not specific to a function of a given application deployed on those devices.

Based on the above information, and perhaps on additional or alternative information, as described herein, an operating system may be generated (518) that is specific to the desired application and/or specified sensor network and associated devices. Thus, the size and resource consumption of the operating system that is generated may be minimized, as no resource consumption is required for software or hardware that is not associated with or needed for the particular applications being deployed. The generation of the operating system may include the synthesis, optimization, and testing of the operating system, as well as compilation of the assembled source code, as described above with respect to FIG. 4.

Once generated, the operating system may be injected onto the specified devices (520). For example, the wireless transceiver 152 of the gateway computer 150 may be used to transmit the operating system wirelessly to the code injector 154 of the device 104, with similar comments applying to the devices 106-110 of the sensor network 102. Such wireless injection allows for fast and convenient deployment of the generated operating system, even in situations where the relevant devices and sensor networks may be remote or otherwise inaccessible.

For example, the sensor network may be deployed underwater, or on an ammunition range, or on an off-shore oil rig, or may simply be installed at a warehouse that is located at a distance from a corporate headquarters. In these cases, the user may access the user interface 148 as part of a web-accessible (or intranet-accessible) portal from virtually anywhere, and may accordingly update the operating system(s) of a desired sensor network. Additionally, even if the user is local to the sensor network 102, it may be the case that no viable or practical access to the devices 104-110 is locally available. Thus, for example, the portal-based user interface 148 may be useful in allowing a traveling or visiting user to efficiently modify sensor networks at a plurality of sites, based on local observations.

With the operating system in place, desired applications may be generated (522). In a simple case, for example, a single application may be deployed to one or more of the devices 104-110 of the sensor network 102. In more complicated examples, multiple applications or application components may be deployed to particular devices of the sensor network. For example, a first device (e.g., the device 104) may receive a first set of applications or application components, while a second device (e.g., the device 106) receives a second set of applications or application components. For example, the different devices 104, 106 may include different sensors and/or output elements, so that applications or application components associated with those sensors and/or output elements may, in some implementations, be deployed only onto these associated devices. In these cases, the operating system may be common to all of the devices associated with the overall application, or may be tailored to some extent for each device, so as to take into account the just-described differences between the devices (i.e., the different application components or the different sensors/output elements).

The generated application(s) may thus be injected onto specified devices (524). For example, similarly to the deployment of the operating system 128, the application(s) may be wirelessly transmitted to the code injector 154, for injection thereof into the memory 112 execution by the CPU 116 and the operating system 128.

Although described above in sequential order, it should be understood that operations of the flowchart 500 may be performed in a different order, or may be performed concurrently. Moreover, in various implementations, some of the operations may be omitted, or others may be added.

Further, it should be understood that virtually any of the operations, techniques, and functionalities described herein as being performed by the user also may be performed in an automated or computerized fashion. For example, the application 130 may be automatically designated for deployment (e.g., according to a schedule, or based on a response to some event or occurrence). In these cases, the operating system generator 138 may automatically decompose components or other features or functions of the application 130 to determine the application requirements 144, and may automatically determine the hardware constraints 146 (e.g., based on known or detected information regarding hardware resources of the sensor network in question). Then, the system 100 may automatically deploy the resulting operating system and application(s). Conversely, some or all of the operations, techniques, and functionalities described herein as being automated may be performed manually, including determinations of application requirements and/or hardware constraints (e.g., the user may directly select or specify desired ones of the operating system components, based on known or preferred application requirements/hardware constraints).

Figure 6:
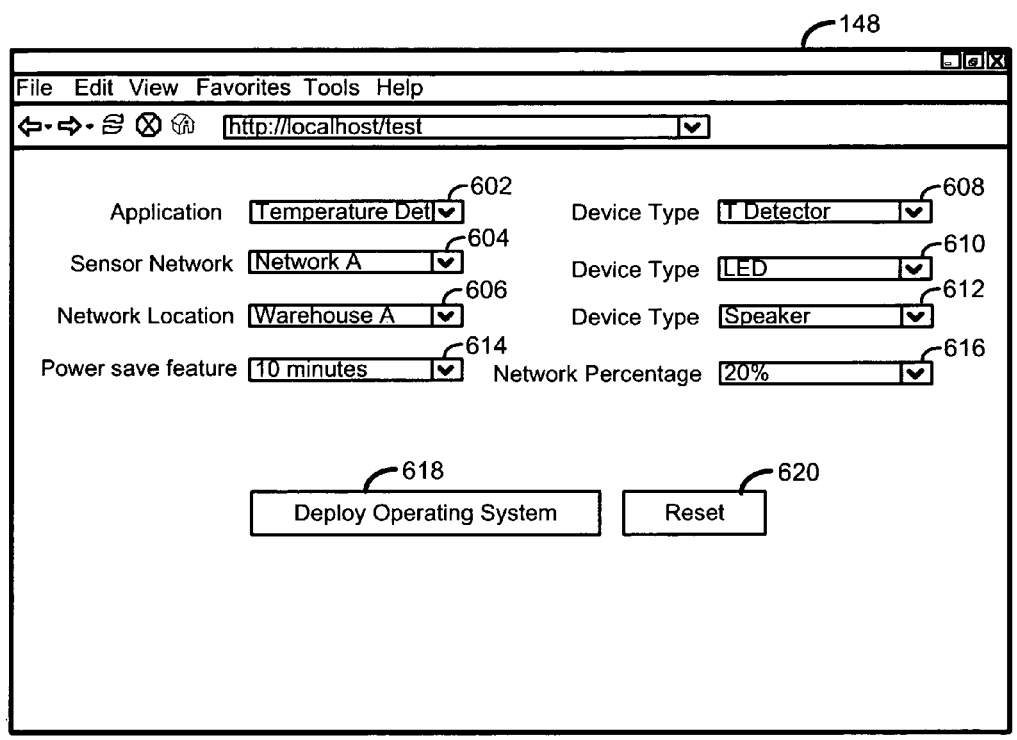
FIG. 6 is an example of a user interface of the system of FIG. 1.

FIG. 6 is an example of the user interface 148 of the system 100 of FIG. 1. In the example of FIG. 6, the user interface 148 may represent an interface associated with an enterprise portal, as described above. In other implementations, the user interface 148 may represent a user interface implemented in a stand-alone manner with/on the PC 140 and/or the gateway computer 150 of FIG. 1.

The user interface 148 of FIG. 6 may be used in conjunction with some or all of the operations of the flowchart 200 of FIG. 2, or of the flowchart 500 of FIG. 5. The user interface 148, or variations thereof, also illustrates additional or alternative operations as those described above with respect to FIG. 2 or 5.

For example, in FIG. 6, a user may interact with the user interface 148 by specifying a desired application in a field 602. In the specific examples of FIG. 6, described and illustrated herein, the user has specified a temperature-detection application in the field 602, using a drop down menu to select from a field of possible or available applications. As already described, such an application may be preconfigured so as to provide the user with an ease of selection and deployment of the application. In other examples, however, the user may be provided with the option of selecting multiple applications for interacting with one another, or may be allowed to specify or provide desired application components for construction into a desired application, or may be allowed to parameterize an existing application in order to achieve a desired goal or effect.

Further in FIG. 6, the user may specify a desired sensor network, or type of sensor network, from a plurality of sensor networks, using a field 604. That is, in one example, the user may specify that a network "A" is to be used for a deployment of the temperature-detection application of the field 602. In some implementations, a number of networks included in the drop down list of the field 604 may be limited based on the previous designation of the temperature-detection application in the field 602, since only certain networks may provide such an application. In other examples, the inverse may be the case, i.e., a specification of the network in the field 604 may constrain contents of the drop down menu of the field 602 to a set of applications that includes the temperature-detection application.

A field 606 may be used to specify a location of the sensor network. For example, the sensor network "A" may represent a certain type of network that is only deployed in certain locations of an enterprise, so that the user may be required to provide a location of a specific network of the specified type as being in a warehouse "A," using the field 606. Of course, in other examples, the network location may be specified first, and a resulting list of available sensor networks and/or applications may be defined and presented in response to the designation of the network location in the field 606.

Further in FIG. 6, the user may access the drop down menu of a field 608 to select a device or device type associated with the specified sensor network. For example, the field 608 may be used to specify types of temperature sensors available for use in the specified temperature-detection application, for selection thereof by the user. As above, the field 608 may be pre-populated with available selections.

Similarly, the user may select a further device type that may be used with the temperature-detection application specified in the field 602. In the example of FIG. 6, the user may select an LED in the field 610 that may be used for visual notification in the temperature detection application of the field 602. In a given instance, the user may, if desired, leave the field 610 blank to designate non-inclusion of the LED. In these cases, as described herein, a resulting operating system that is generated may include (or not include) a driver or other associated component for support of the LED and for support of a desired use of the LED (e.g., a frequency of blinking of the LED, depending on detected temperature ranges).

A field 612 allows the possibility of selecting a secondary output device for use with the temperature-detection application of the field 602. Specifically, in the example of FIG. 6, the field 612 specifies that an audio speaker may be selected for admitting an audio alarm in response to detection of an undesirable temperature. As with the LED of the field 610, such a speaker may be optional for inclusion with the temperature detection application of the field 602, so that, again, a resulting operating system may be generated accordingly.

As described above, additional system and/or non-functional constraints may be specified for use in generating an operating system. In the example of FIG. 6, a non-functional constraint may be specified using a field 614. For example, a power saving feature may be specified according to which sensors associated with the temperature-detection application of the field 602 may go into a power-conserving state after some number of minutes (e.g., ten minutes) of inactivity.

Additionally, a field 616 illustrates an example of a system constraint in which a percentage of devices of the sensor network for which the operating system may be generated and/or is limited. For example, devices may be deployed in a given location (e.g., the warehouse location) such that sufficient temperature-detection functionality may be provided by some subset of available devices, so that use of all devices of the sensor network may be redundant or wasteful.

Once all the fields of user interface 148 have been selected or otherwise specified, the user may implement generation and deployment of a resulting operating system through a selection of a button 618. On the other hand, the user may re-set some or all fields of the user interface 148 using a reset button 620.

Although the user interface 148 of FIG. 6 is illustrated as a single screen, it should be understood that various fields 602-620 of the user interface 148 may be provided using multiple screens. For example, considering the example of FIG. 5, it may be the case that the fields 604 and/or 606 are presented in a first screen, so that system 100 may narrow a field of possible applications to be presented in the field 602, based on the selections of a desired sensor network and/or sensor network location.

Although the user interface 148 is illustrated as including drop-down menus, it should be understood that any desired or appropriate layout elements may be used to provide the functionality described herein, or similar functionality. For example, a drag-and-drop tool/interface may be used that allows the user to select desired application components and/or hardware resources.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
   determining application requirements for interfacing and executing at least two different applications using a sensor network, the sensor network including a plurality of devices, wherein the at least two different applications are movable among the plurality of devices of the sensor network;
   determining hardware constraints associated with the devices of the sensor network;
   dynamically generating an operating system using an operating system generator for the sensor network by
      matching a first one or more operating system components with one or more application requirements, the application requirements configured for interfacing and executing the at least two different applications using the sensor network and
      matching a second one or more operating system components with one or more hardware constraints, the hardware constraints being associated with the devices of the sensor network,
   Dynamically generating the operating system for deployment by including the first and the second one or more matched operating system components, the operating system configured to support operation of any of the at least two different applications during movement thereof among the plurality of devices of the sensor network,
   Reviewing, using a separate watchdog application, the dynamically generated operating system and including core operating system components not matching the application requirements or hardware constraints in the event that the core operating components are needed for operation of the operating system in the sensor network; and
   dynamically deploying the operating system onto the plurality of devices of the sensor network.

2. The method of claim 1 wherein determining application requirements for executing at least two applications using a sensor network comprises:
   receiving a designation of the at least two applications for deployment on the plurality of devices; and
   decomposing functionality associated with the at least two applications to determine the application requirements.

3. The method of claim 1 wherein determining application requirements for executing at least two applications using a sensor network comprises:
   receiving the application requirements from a user by way of a user interface.

4. The method of claim 1 wherein determining application requirements for executing at least two applications using a sensor network comprises:
   defining a condition to be sensed by a sensor associated with at least one of the devices; and
   defining a desired response of at least one of the at least two applications to the condition.

5. The method of claim 4 wherein defining a desired response of the at least one of the at least two applications to the condition comprises:
   defining an operation of an output element associated with at least one of the devices as being included in the desired response.

6. The method of claim 1 wherein determining hardware constraints associated with the devices comprises:
   determining hardware resources associated with at least one of the devices, the hardware resources including one or more of a sensor, an output element, a processor, a memory, a wireless communications device, or a power supply.

7. The method of claim 1 wherein determining hardware constraints associated with the devices comprises:
determining functionality provided by hardware resources associated with the devices, with respect to the application requirements.

8. The method of claim 1 wherein generating an operating system based on the application requirements and the hardware constraints comprises:
synthesizing the operating system using a plurality of the operating system components combined with one another based on the application requirements and the hardware constraints.

9. The method of claim 1 wherein generating an operating system based on the application requirements and the hardware constraints comprises:
comparing the application requirements and the hardware constraints to determine functionality provided by the operating system in supporting the at least two applications and/or hardware resources of the devices.

10. The method of claim 1 wherein generating an operating system based on the application requirements and the hardware constraints comprises:
generating the operating system to provide support for a subset of available hardware resources of the devices, the subset of available hardware resources being sufficient to implement the application requirements and execute the at least two applications.

11. The method of claim 1 comprising:
determining network-wide constraints associated with the sensor network; and
generating the operating system based on the network-wide constraints.

12. The method of claim 1 comprising: determining non-functional constraints that are not necessary for a function of the at least two applications, the non-functional constraints being associated with the sensor network or with the devices; and
generating the operating system based on the non-functional constraints.

13. The method of claim 1 comprising:
transmitting the operating system to the devices, independently of the at least two applications; and
injecting the operating system onto the devices for operation thereon.

14. The method of claim 13 comprising:
injecting the at least two applications onto the devices for execution thereof in conjunction with the operating system.

15. A computer-implemented system including computer-executable code recorded on a non-transitory computer-readable medium comprising:
a components repository that is operable via the computer-executable code to store operating system components associated with functionality to be provided to a plurality of devices of a sensor network;
an operating system generator that is operable via the computer-executable code to dynamically generate an operating system for the sensor network by:
matching a first one or more components of the operating system with one or more components of application requirements associated with interfacing and executing at least two different applications on the plurality of devices, the at least two different applications movable among the plurality of devices of the sensor network, and
further by matching a second one or more components of the operating system with one or more components of hardware constraints associated with the plurality of devices, the operating system configured to support operation of the at least two different applications during movement thereof among the plurality of devices of the sensor network; and
dynamically generating an operating system for deployment by including the first and the second one or more matched operating system components
one or more separate watchdog applications configured to review the dynamically generated operating system and include core operating system components not matching by the application requirements or hardware constraints in the event that the core operating components are needed for operation of the operating system in the sensor network.

16. The system of claim 15 wherein the components repository is operable via the computer-executable code to provide hardware drivers or communications elements associated with hardware resources of the devices.

17. The system of claim 15 wherein the operating system generator is operable via the computer-executable code to determine the application requirements by way of a user interface.

18. The system of claim 15 wherein the operating system generator is operable via the computer-executable code to determine the hardware constraints as being associated with hardware resources of the devices, the hardware resources including one or more of a sensor, an output element, a processor, a memory, a wireless communications device, or a power supply.

19. The system of claim 15 comprising:
a library code repository including programming code templates for use by the operating system generator in synthesizing the operating system from the operating system components.

20. An apparatus comprising a non-transitory storage medium having instructions stored thereon that are executable by at least one processor, the instructions including:
a first code segment for determining application requirements associated with at least two different applications to be dynamically deployed onto a plurality of devices of a sensor network, the at least two different applications movable among the plurality of devices of the sensor network;
a second code segment for determining hardware constraints associated with hardware resources of the plurality of devices; and
a third code segment for dynamically generating an operating system for the sensor network by:
matching a first one or more operating system components with one or more application requirements associated with the at least two different applications and matching a second one or more operating system components with the hardware constraints associated with the hardware resources of the devices, and
dynamically generating an operating system for deployment by including the first and second one or more matched operating system components, the operating system configured to support operation of the at least two different applications during movement thereof among the plurality of devices of the sensor network;

a fourth code segment including a separate watchdog application configured to review the dynamically generated operating system and include core operating system components not specified by the application requirements or hardware constraints in the event that the core operating components are needed for operation of the operating system in the sensor network; and a fifth code segment for dynamically deploying the operating system onto the plurality of devices of the sensor network.

* * * * *